(12) United States Patent
Mangone, Jr.

(10) Patent No.: US 6,632,994 B1
(45) Date of Patent: Oct. 14, 2003

(54) CONTAINMENT APPARATUS

(76) Inventor: Peter G. Mangone, Jr., 2113 Montane Dr. East, Golden, CO (US) 80400

( * ) Notice: Subject to any disclaimer, the term of this patent is extended or adjusted under 35 U.S.C. 154(b) by 0 days.

(21) Appl. No.: 10/310,551

(22) Filed: Dec. 5, 2002

(51) Int. Cl.[7] .............................................. H02G 13/00
(52) U.S. Cl. ...................... 174/48; 174/68.1; 174/68.3; 174/72 A; 248/68.1; 248/74.1; 248/75; 248/49; 24/17 B; 52/714
(58) Field of Search ........................ 174/48, 68.1, 68.3, 174/72 A; 248/68.1, 74.1, 75, 49; 24/17 B; 52/714

(56) References Cited

U.S. PATENT DOCUMENTS

| | | | |
|---|---|---|---|
| 4,092,766 A | * 6/1978 | Meyer | ........................ 24/295 |
| 4,423,284 A | 12/1983 | Kaplan | |
| 4,534,147 A | 8/1985 | Cristell | |
| 4,733,020 A | 3/1988 | Elzy | |
| 5,069,254 A | 12/1991 | Vogelsang | |
| 5,271,585 A | * 12/1993 | Zetena, Jr. | ........................ 248/49 |
| 5,683,018 A | * 11/1997 | Sullivan et al. | ................ 223/85 |
| 6,037,538 A | 3/2000 | Brooks | |
| 6,148,585 A | * 11/2000 | Baker | ........................ 52/737.4 |
| 6,274,814 B1 | * 8/2001 | Iavarone | ...................... 174/68.3 |

OTHER PUBLICATIONS

ICM Corporation, Online Ordering Catalog, 7 pages, Denver, CO, USA., http://www.icmcorp.net.
CABLETEK, Online Ordering Catalog, 5 pages, Elyria, OH, USA., http://www.cable–tek.com.
MULTILINK Broadband, Online Ordering Catalog, 9 pages, Elyria, OH,USA., http://www.multilinkbroadband.com.

* cited by examiner

Primary Examiner—Chau N. Nguyen
Assistant Examiner—Anton Harris
(74) Attorney, Agent, or Firm—Gardner Carton & Douglas LLC

(57) ABSTRACT

The present invention provides a containment apparatus for cables, wires, and other cylindrical objects. The containment apparatus includes a channel member adapted to be attached to a clip member, the clip member is adapted to receive the channel member and is adapted to be mounted to a surface such as an exterior wall or a pole. The channel member is made of a rigid to semi-rigid material which can flex and can resile or can be urged back into its original position whereby the channel member is fixedly attached to the clip member. Multiple channel members can be adapted to be connected, one to another.

25 Claims, 9 Drawing Sheets

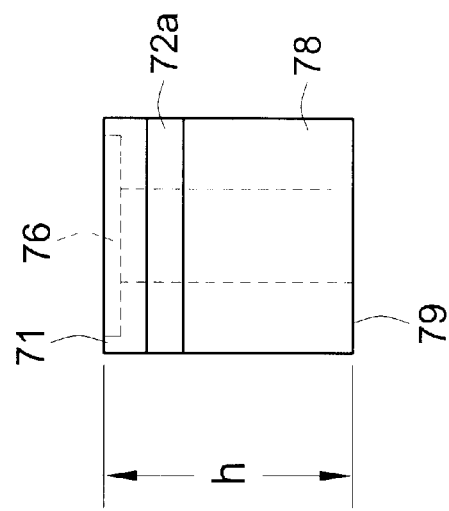

CONTAINMENT APPARATUS

FIELD OF THE INVENTION

This invention relates to a conduit-type apparatus for containment of wires, cabling, and the like. In particular, the present invention includes an open channel conduit and a means for mounting the conduit to a surface.

BACKGROUND OF THE INVENTION

Cables, wires, and other cylindrical objects are often affixed to exposed surfaces, and are thus susceptible to damage. Various conduit-type systems are employed to provide protection for cables and also to improve aesthetic qualities. Protection of this type can extend the useful life-span of cables and wires.

One known conduit apparatus employs a clip having only a few points of contact, and is thus removably fixedly attached, which is a disadvantage if a tamper proof system that remains fixed in place is desired. Other known conduit systems are completely enclosed or ensheathed, which makes installation more difficult. In addition, these conduits are not designed to flex as a requirement for installation.

Another problem presented by long cable and wire runs is installation of the conduit-type system. Removal of existing wiring and subsequent insertion of wires into and through a conduit can be time consuming and costly. Therefore, a modular containment apparatus is needed that can be installed easily and readily onto a surface such as an exterior wall, including installation directly over existing exposed wires or cables. It would also be advantageous to be able to attach a modular containment apparatus to a curved surface such as a pole.

Additionally, it would be an advantage to have a modular containment apparatus that can be fixedly attached into a desired position and not easily removed, damaged, or tampered with. Therefore, a conduit-type cable guard is needed that can be readily installed on various surfaces and that can be secured in position using a minimum number of specialized parts.

BRIEF SUMMARY OF THE INVENTION

The present invention provides a containment apparatus that can be fixedly attached to various surfaces, including a wall or a pole. The containment apparatus includes a generally U-shaped channel member having a crown portion, a first leg, and a second leg; a first tang and a first ledge disposed on the first leg; a second tang and a second ledge disposed on the second leg; and a clip member having a first arm and a second arm, the clip member adapted to be mounted to a surface, the clip member further adapted to receive the generally U-shaped channel member such that the first arm is adapted to engage the first tang and the first ledge and the second arm is adapted to engage the second tang and the second ledge.

In another embodiment of the present invention, the generally U-shaped channel member can flex in an arcuate path that is away from a center of the channel member whereby the generally U-shaped channel member can be positioned to become attached to the clip member, and wherein the generally U-shaped channel member can resile or can be urged in an arcuate path that is toward the center of the channel member whereby the generally U-shaped channel member can be attached to the clip member.

In another embodiment of the present invention, the first tang and the second tang can flex whereby the generally U-shaped channel member can be positioned to become attached to the clip member, and wherein the first tang and the second tang can resile or can be urged back into their original position whereby the generally U-shaped channel member can be attached to the clip member.

BRIEF DESCRIPTION OF THE DRAWINGS

FIG. 6 illustrates an elevation view of the T-shaped clip member of FIG. 5.

FIG. 7 illustrates a side elevation view of the T-shaped clip member of FIG. 6.

FIG. 8 illustrates a bottom view of the T-shaped clip member of FIG. 6.

DETAILED DESCRIPTION OF THE INVENTION

Figure 1:
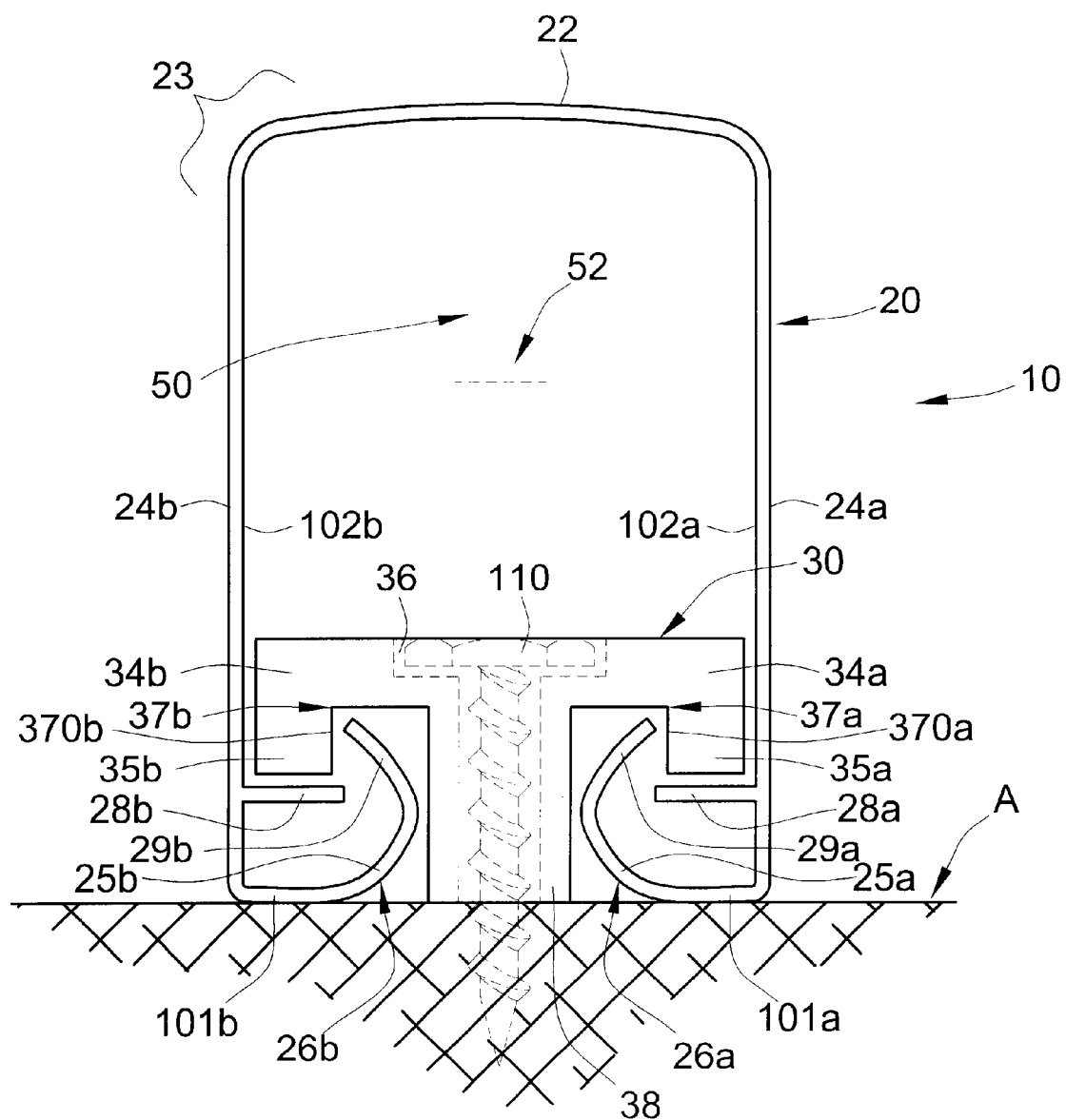
FIG. 1 illustrates a sectional view of a containment apparatus of the present invention having a channel member, a clip member, and a fastener, intersecting only the channel member.

With reference to FIG. 1, there is provided, according to one embodiment of the present invention, a containment apparatus 10 having an interior space 50. The containment apparatus 10 includes a channel member 20 having a crown portion 22, a first leg 24a, and a second leg 24b; the containment apparatus 10 also includes a clip member 30 having a stem 38, a first arm 34a connected to the stem 38, and a second arm 34b connected to the stem 38. The channel member 20 is relatively long and extends linearly over a surface A; the clip member 30 is relatively small in relation to the containment apparatus 10 and is adapted to be secured, mounted, or attached to the surface A. The channel member 20 is adapted to contact the surface A with the first leg 24a and the second leg 24b. The surface A may be substantially flat, such as a wall or siding. Alternatively, the surface A may be substantially curved, such as a telephone pole. The first leg 24a of the channel member 20 has an interior surface 102a, and the second leg 24b of the channel member 20 has an interior surface 102b. As used herein, the term tang is defined as a projecting strip, tongue, sharp point, or prong. The first leg 24a includes a first tang 26a at its terminal end projecting into the interior space 50, and the second leg 24b includes a second tang 26b at its terminal end projecting into the interior space 50. The first tang 26a includes a first general abutment portion 101a, a first curved portion 25a, and a first end portion 29a at its terminal end; the second tang 26b includes a second general abutment portion 101b, a second curved portion 25b, and a second end portion 29b at its terminal end. The first general abutment portion 101a is generally perpendicular to the first leg 24a and the second general abutment portion 101b is generally perpendicular to the second leg 24b. The first general abutment portion 101a and the second general abutment portion 101b are generally in a plane that is parallel to the surface A and are adapted to be in close contact with the surface A. In an alternative embodiment, the first general abutment portion 101a and the second general abutment portion 101b are generally in a plane that is tangential to the surface A and are adapted to be in close contact with the surface A. The first general abutment portion 101a is connected to the first curved portion 25a, which curves upward into the interior space 50 and then back toward the first leg 24a, and the first curved portion 25a is connected to the first end portion 29a, which projects toward the interior surface 102a of the first leg 24a but does not reach the interior surface 102a, providing a gap. The second general abutment portion 101b is connected to the second curved portion 25b, which curves upward into the interior space 50 and then back toward the second leg 24b, and the second curved portion 25b is connected to the second end portion 29b, which projects toward the interior surface 102b of the second leg 24b but does not reach the interior surface 102b, providing a gap. The first leg 24a also includes a first ledge 28a projecting into the interior space 50, disposed above the first general abutment portion 101a of the first tang 26a and generally parallel to the plane that contains the first general abutment portion 101a and the second general abutment portion 101b, and disposed below the first end portion 29a of the first tang 26a; the second leg 24b includes a second ledge 28b projecting into the interior space 50, disposed above the second general abutment portion 101b of the second tang 26b and generally parallel to the plane that contains the first general abutment portion 101a and the second general abutment portion 101b, and disposed below the second end portion 29b of the second tang 26b. Alternatively, the first tang 26a and the first ledge 28a may be integrally formed so as to provide a unitary piece; and alternatively, the second tang 26b and the second ledge 28b may be integrally formed so as to provide a unitary piece. The channel member 20 is adapted to be attached to the clip member 30; the clip member 30 is adapted to receive the channel member 20.

The channel member 20 has a geometric shape 23. For example, the channel member 20 can be generally U-shaped in cross section, including bell-shaped, and can also include other shapes such as box-shaped, triangular, and other geometric shapes 23 with one, two, or three open sides, such as a pentagon, hexagon, or octagon. The channel member 20 can also have a shape that is not symmetrical. The geometric shape 23 of the channel member 20 includes a center of the channel member 52, which defines the approximate center point of the geometric shape 23. On average, any point on a given side of the geometric shape 23 may be approximately equidistant from the center of the channel member 52. The channel member 20 can be made in elongated sections, for example in 4 foot, 6 foot, or 12 foot lengths, by a method such as extrusion. Multiple channel members 20 can be adapted to be connected, one to another. The channel member 20 can be rigid to semi-rigid, but must be at least slightly flexible, so that first leg 24a and second leg 24b can flex in a generally arcuate path that is away from the center of the channel member 52 whereby the channel member 20 can be positioned to become attached to the clip member 30, and so that first leg 24a and second leg 24b can resile or can be urged in a generally arcuate path that is toward the center of the channel member 52 whereby the channel member 20 can be attached to the clip member 30. Additionally, the first tang 26a can flex toward the interior surface 102a of the first leg 24a and the second tang 26b can flex toward the interior surface 102b of the second leg 24b whereby the channel member 20 can be positioned to become attached to the clip member 30, and then the first tang 26a can resile away or can be urged away from the interior surface 102a of the first leg 24a and the second tang 26b can resile away or can be urged away from the interior surface 102b of the second leg 24b whereby the channel member 20 can be attached to the clip member 30. In an alternative embodiment, the parts of the channel member 20 can flex, but can resile only when additional force is applied, that is, the parts of the channel member 20 can be urged back into their original position. Materials useful for fabrication of the channel member 20 include plastic, wood, metal, and composite materials. Examples of plastics useful for the channel member 20 of the present invention include, for example, polyvinyl chloride ("PVC"), polyethylene terephthalate ("PET"), polyethylene ("PE"), and polypropylene ("PP").

The clip member 30 is adapted to be mounted to the surface A. The surface A may be substantially flat, such as a wall or siding. Alternatively, the surface A may be substantially curved, such as a telephone pole. The clip member 30 can include a fastener opening 36 in the stem 38 which is adapted to receive a fastener 110 in order to attach clip member 30 to the surface A. The fastener 110 can be a surface penetrating fastening device such as a screw or nail. The chip member 30 can include multiple fastener openings 36. Alternatively, the clip member 30 can be attached to the surface A with a glue or adhesive. Alternatively, the clip member 30 and the fastener 110 may be integrally formed so as to provide a unitary piece. The first arm 34a of the clip member 30 includes a first overhang 35a at its terminal end that is generally parallel to the stem 38 and includes a first underarm portion 37a having a first parallel wall 370a that is generally parallel to the stem 38; the second arm 34b of the clip member 30 includes a second overhang 35b at its terminal end that is generally parallel to the stem 38 and includes a second underarm portion 37b having a second parallel wall 370b that generally parallel to the stem 38. The clip member 30 is also adapted to receive the channel member 20 such that the first parallel wall 370a of the first arm 34a is adapted to engage the first tang 26a and the first overhang 35a is adapted to engage the first ledge 28a; and the second parallel wall 370b of the second arm 34b is adapted to engage the second tang 26b and the second overhand 35a is adapted to engage the second ledge 28b. Materials useful for fabrication of the clip member 30 may be the same or different from the channel member 20, but preferably a relatively rigid material, including metal, plastic, and composite materials. An example of a metal useful for the clip member 30 is carbon steel. Examples of plastics useful for the clip member 30 include PET, PE, PP, polycarbonate, and polytetrafluoroethylene ("PTFE"). In one embodiment, a plurality of clip members 30 can be used to mount a length of the channel member 20. For example, 3 or 4 clip members 30 can be used to mount a 6 foot length of the channel member 20.

Figure 1A:
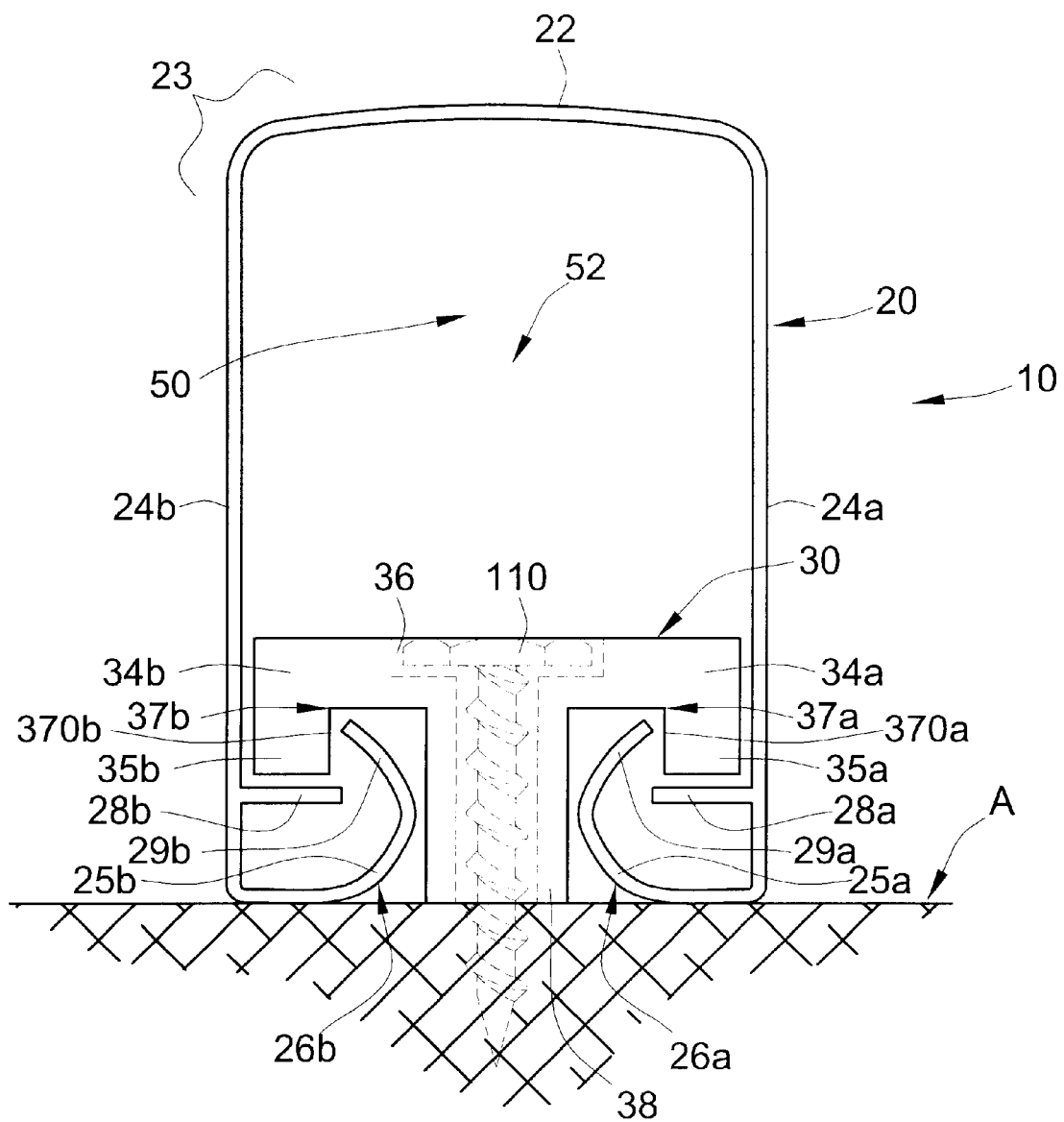
FIG. 1A is the sectional view of FIG. 1 depicting the contacting surfaces of the containment apparatus of the present invention that engage each other and connect the channel member to the clip member together.

FIG. 1A describes the contacting surfaces of a containment apparatus 10 that engage each other and connect the channel member 20 and the clip member 30 together, with reference to FIG. 1. As shown in FIG. 1A, a channel member 20 is adapted to be attached to a clip member 30, and the clip member 30 is adapted to receive a channel member 20. The clip member 30 can include a fastener opening 36 in a stem 38 which is adapted to receive a fastener 110 in order to attach the clip member 30 to a surface A. The fastener 110 can be a surface penetrating fastening device such as a screw or nail. In order to inhibit movement or prevent removal of the channel member 20 generally in the direction of the crown portion 22 of the channel member 20 or generally away from the surface A, the first overhang 35a of the first arm 34a of the clip member 30 engages the first ledge 28a of the channel member 20, and the second overhang 35b of the second arm 34b of the clip member 30 engages the second ledge 28b of the channel member 20. In order to inhibit movement or prevent removal in a direction that is generally parallel to the surface A, or tangential to the surface A, the first end portion 29a of the first tang 26a of the generally channel member 20 engages the first parallel wall 370a of the first arm 34a of the clip member 30, and the second end portion 29b of the second tang 26b of the channel member 20 engages the second parallel wall 370b of the second arm 34b of the clip member 30. Thus, the channel member 20 and the clip member 30 can be engaged and connected to form the containment apparatus 10 of the present invention. In a preferred embodiment of the present invention, the channel member 20 and clip member 30 can be generally tightly fitted together. In another embodiment of the present invention, the channel member 20 and clip member 30 can be substantially fixedly attached.

Figure 2:
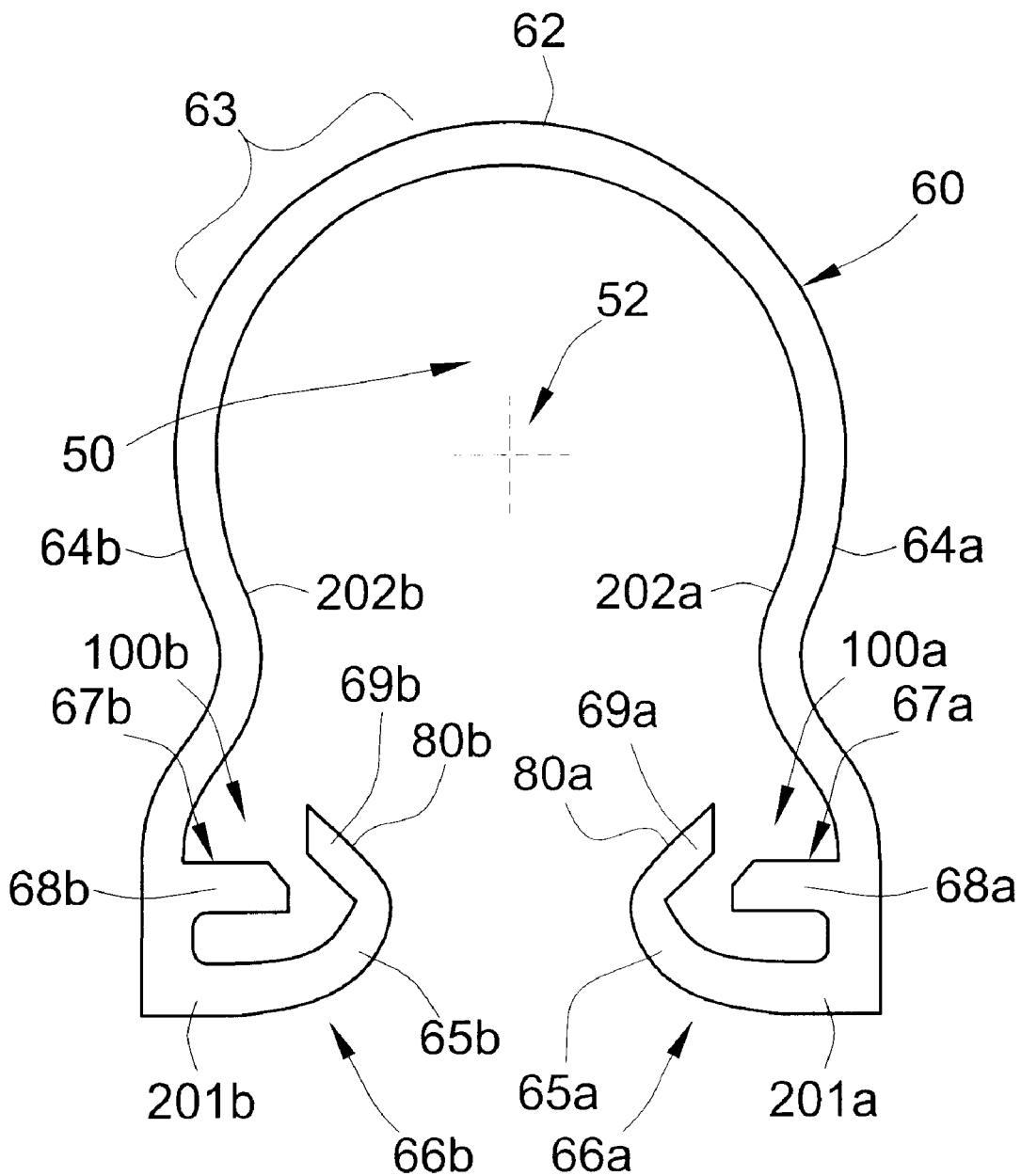
FIG. 2 illustrates a sectional view of a generally U-shaped channel member in a preferred embodiment of the present invention.

In a preferred embodiment of the present invention, FIG. 2 depicts a generally U-shaped channel member 60 further having a bell shape, and having an interior space 50, a crown portion 62 having a circular arc shape 63, a first leg 64a, and a second leg 64b. The generally U-shaped channel member 60 is adapted to contact a surface A (not shown) with the first abutment portion 201a of the first leg 64a and the second abutment portion 201b of the second leg 64b. The surface A may be substantially flat, such as a wall or siding. Alternatively, the surface A may be substantially curved, such as a telephone pole. The first leg 64a of the generally U-shaped channel member 60 has an interior surface 202a and the second leg 64b of the channel member 60 has an interior surface 202b. The first leg 64a includes a first tang 66a at its terminal end projecting into the interior space 50, and the second leg 64b includes a second tang 66b at its terminal end projecting into the interior space 50. The first tang 66a includes a first general abutment portion 201a, a first curved portion 65a, and a first end portion 69a at its terminal end; the second tang 66b includes a second general abutment portion 201b, a second curved portion 65b, and a second end portion 69b at its terminal end. The first general abutment portion 201a is generally perpendicular to the first leg 64a at the point where it projects from the first leg 64a, and the second general abutment portion 201b is generally perpendicular to the second leg 64b at the point where it projects from the second leg 64b. The first general abutment portion 201a and the second general abutment portion 201b are generally in a plane that is parallel to the surface A (not shown) and are adapted to be in close contact with the surface A. In an alternative embodiment, the first general abutment portion 201a and the second general abutment portion 201b are generally in a plane that is tangential to the surface A and are adapted to be in close contact with the surface A. The first general abutment portion 201a is connected to the first curved portion 65a, which curves upward into the interior space 50 and then back toward the first leg 64a, and the first curved portion 65a is connected to the first end portion 69a, which projects toward the interior surface 202a of the first leg 64a but does not reach the interior surface 202a, providing a gap. The second general abutment portion 201b is connected to the second curved portion 65b, which curves upward into the interior space 50 and then back toward the second leg 64b, and the second curved portion 65b is connected to the second end portion 69b, which projects toward the interior surface 202b of the second leg 64b but does not reach the interior surface 202b, providing a gap. The first leg 64a also includes a first ledge 68a projecting into the interior space 50, disposed above the first general abutment portion 201a of the first tang 66a and generally parallel to the plane that contains the first general abutment portion 201a and the second general abutment portion 201b, and disposed below the first end portion 69a of the first tang 66a; the second leg 64b also includes a second ledge 68b projecting into the interior space 50, disposed above the second general abutment portion 201b of the second tang 66b and generally parallel to the plane that contains the first general abutment portion 201a and the second general abutment portion 201b, and disposed below the second end portion 69b of the second tang 66b. The first ledge 69a includes a first top face 67a, and the second ledge 68b includes a second top face 67b. Alternatively, the first tang 66a and the first ledge 68a may be integrally formed so as to provide a unitary piece; and alternatively, the second tang 66b and the second ledge 68b may be integrally formed so as to provide a unitary piece. The first end portion 69a of the first tang 66a can have an angle of about 45' where one arm of the 45° angle is generally perpendicular to the first top face 67a, and the other arm of the 45° angle is defined by an angled surface 80a of the first end portion 69a. Thus, the first tang 66a can have an angle of about 45°. Alternatively, the first tang 66a can have other configurations at the first end portion 69a. The second end portion 69b of the second tang 66b can have an angle of about 45° where one arm of the 45° angle is generally perpendicular to the second top face 67b, and the other arm of the 45° angle is defined by an angled surface 80b of the second end portion 69a. Thus, the second tang 66b can have an angle of about 45°. Alternatively, the second tang 66b can have other configurations at the second end portion 69b. The first ledge 68a and the gap between the interior surface 202a of the first leg 64a and the first end portion 69a define a first channel 100a; the second ledge 68b and the gap between the interior surface 202b of the second leg 64b and the second end portion 69b define a second channel 100b. The first channel 100a of the generally U-shaped channel member 60 and the second channel 100b of the generally U-shaped channel member 60 can be adapted to receive a T-shaped clip member 70 (not shown).

The circular arc shape 63 of the generally U-shaped channel member 60 includes a center of the channel member 52, which defines the approximate center point of the circular arc shape 63 that on average is approximately equidistant from any point on the circular arc shape 63. On average, any point on the circular arc shape 63 may be approximately equidistant from the center of the channel member 52. The generally U-shaped channel member 60 can be rigid to semi-rigid, but must be at least slightly flexible, so that it can flex in a generally arcuate path that is away from the center of the channel member 52 whereby the generally U-shaped channel member 60 can be positioned to become attached to the T-shaped clip member 70 (not shown), and can resile or can be urged in a generally arcuate path that is toward the center of the channel member 52 whereby the generally U-shaped channel member 60 can be attached to the T-shaped clip member 70 (not shown). Additionally, the generally U-shaped channel member 60 can be made having various diameters. Materials useful for fabrication of the generally U-shaped channel member 60 include plastic, wood, metal, and composite materials. Examples of plastics useful for the generally U-shaped channel member 60 of the present invention include, for example, PVC, PET, PE, and PP.

Figure 3:
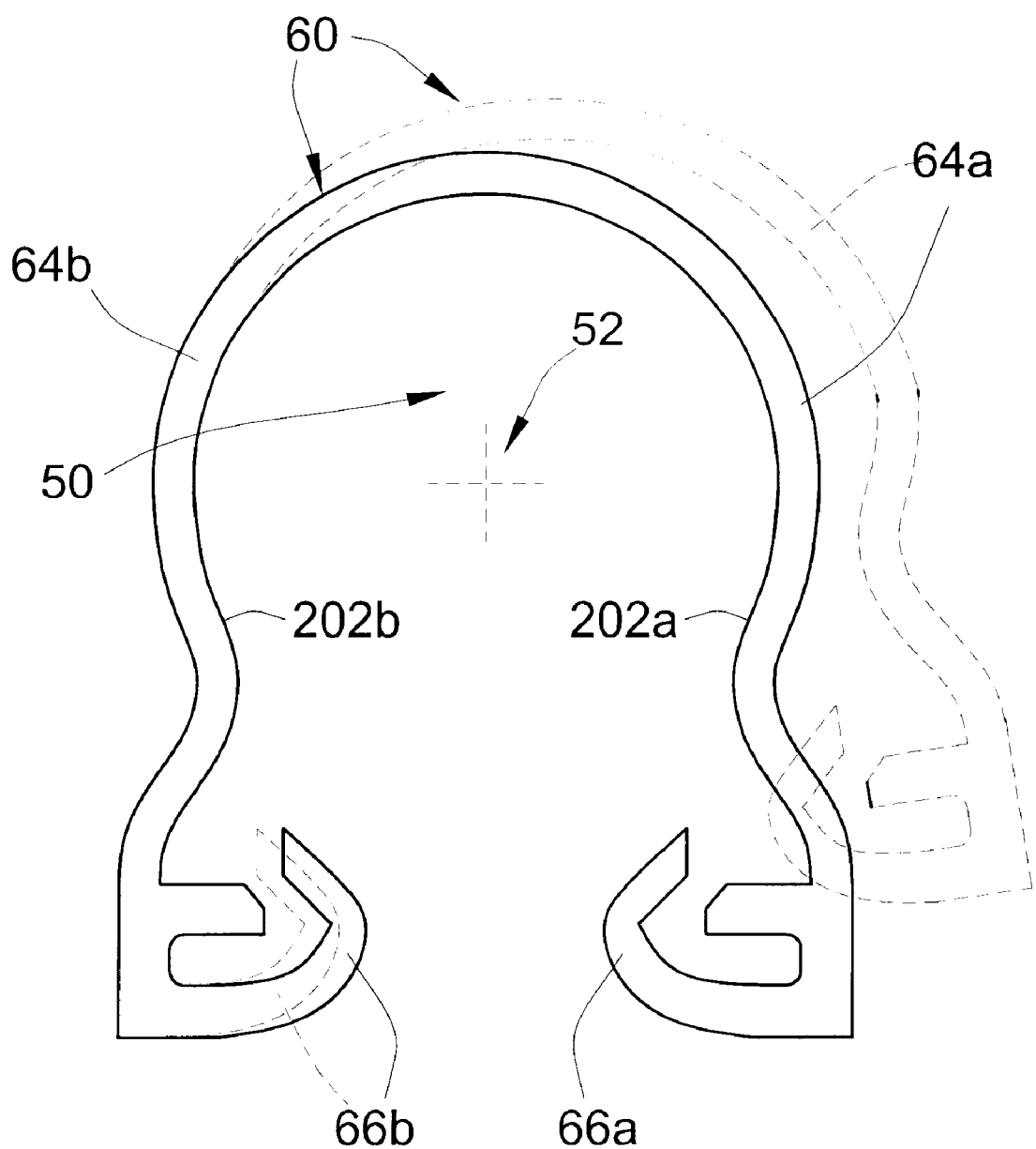
FIG. 3 illustrates the generally U-shaped channel member of FIG. 2 as it flexes.

FIG. 3 depicts the resilient and slightly flexible nature of a generally U-shaped channel member 60 as it is flexed in order to attach it to a T-shaped clip member 70 (not shown). As an example, a first leg 64*a* of the generally U-shaped channel member 60 can be flexed outward in a generally arcuate path that is away from a center of the channel member 52. Alternatively, a second leg 64*b* of the generally U-shaped channel member 60 can also be flexed outward in a similar manner. After flexion, the first leg 64*a* or the second leg 64*b* can resile or can be urged in a generally arcuate path that is toward the center of the channel member 52 to its original position and shape. As an example, a second tang 66*b* can be flexed toward the interior surface 202*b* of the second leg 64*b*. Alternatively, a first tang 66*a* can also be flexed in a similar manner. After flexion, the second tang 66*b* can resile away or can be urged away from the interior surface 202*b* of the second leg 64*b* to its original position and shape. Alternatively, after flexion, the first tang 66*a* can resile away or can be urged away from the interior surface 202*a* of the first leg 64*a* to its original position and shape. In a preferred embodiment, the generally U-shaped channel member 60 is made from a semi-rigid plastic such as PVC. In an alternative embodiment, the parts of the generally U-shaped channel member 60 can flex, but can resile only when additional force is applied, that is, the parts of the generally U-shaped channel member 60 can be urged back into their original position.

Figure 4:
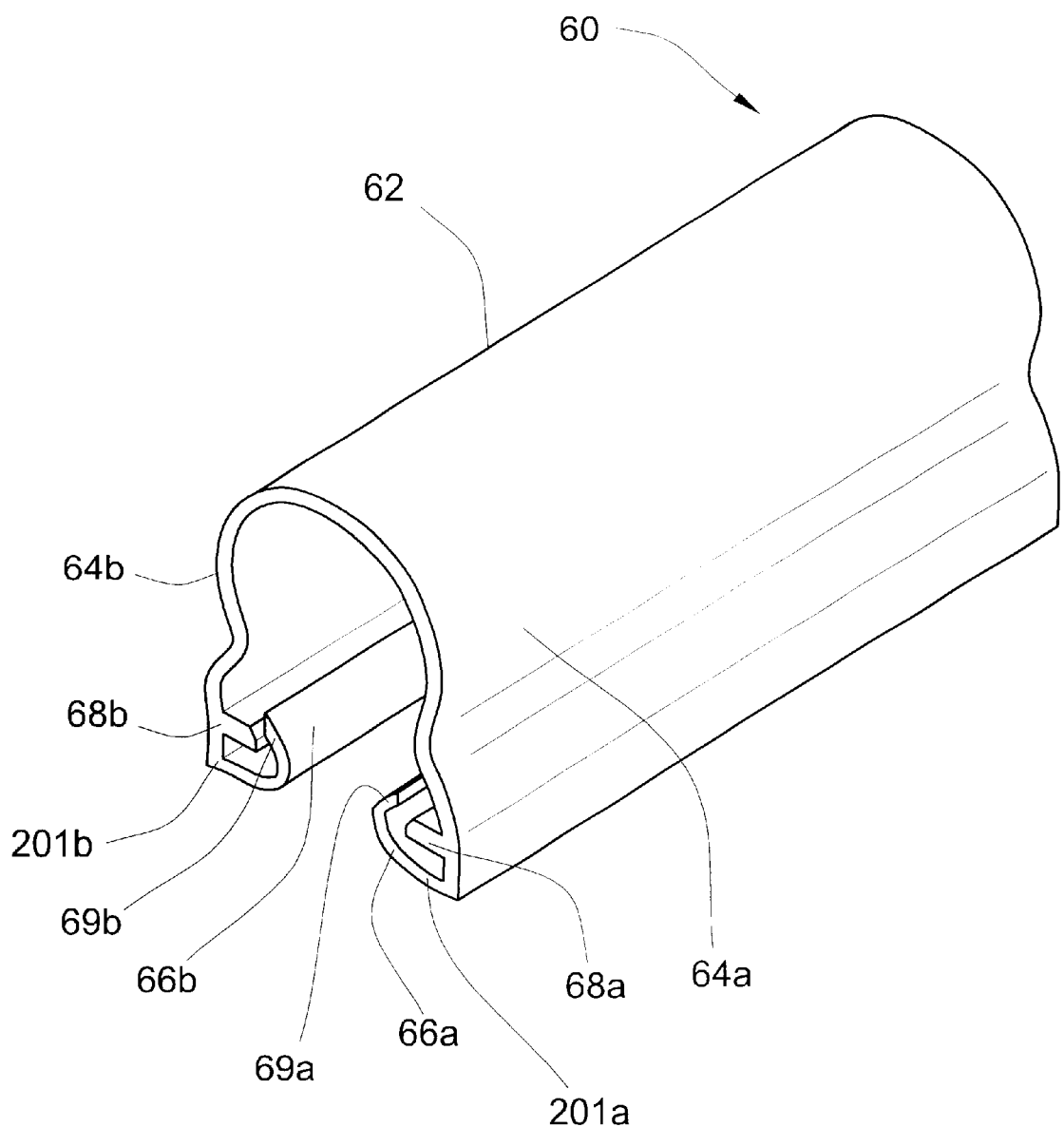
FIG. 4 illustrates a perspective view of the generally U-shaped channel member of FIG. 2.

FIG. 4 is a perspective view of a short segment of the generally U-shaped channel member 60 of FIG. 2. The generally U-shaped channel member 60 includes a crown portion 62, a first leg 64*a*, and a second leg 64*b*. The first leg 64*a* includes a first tang 66*a* at its terminal end and the second leg 64*b* includes a second tang 66*b* at its terminal end. The first tang 66*a* includes a first general abutment portion 201*a* and a first end portion 69*a* at its terminal end; the second tang 66*b* includes a second general abutment portion 201*b* and a second end portion 69*b* at its terminal end. The first leg 64*a* also includes a first ledge 68*a* disposed above the first general abutment portion 201*a* of the first tang 66*a*, and disposed below the first end portion 69*a* of the first tang 66*a*; the second leg 64*b* also includes a second ledge 68*b* disposed above the second general abutment portion 201*b* of the second tang 66*b*, and disposed below the second end portion 69*b* of the second tang 66*b*.

Figure 5:
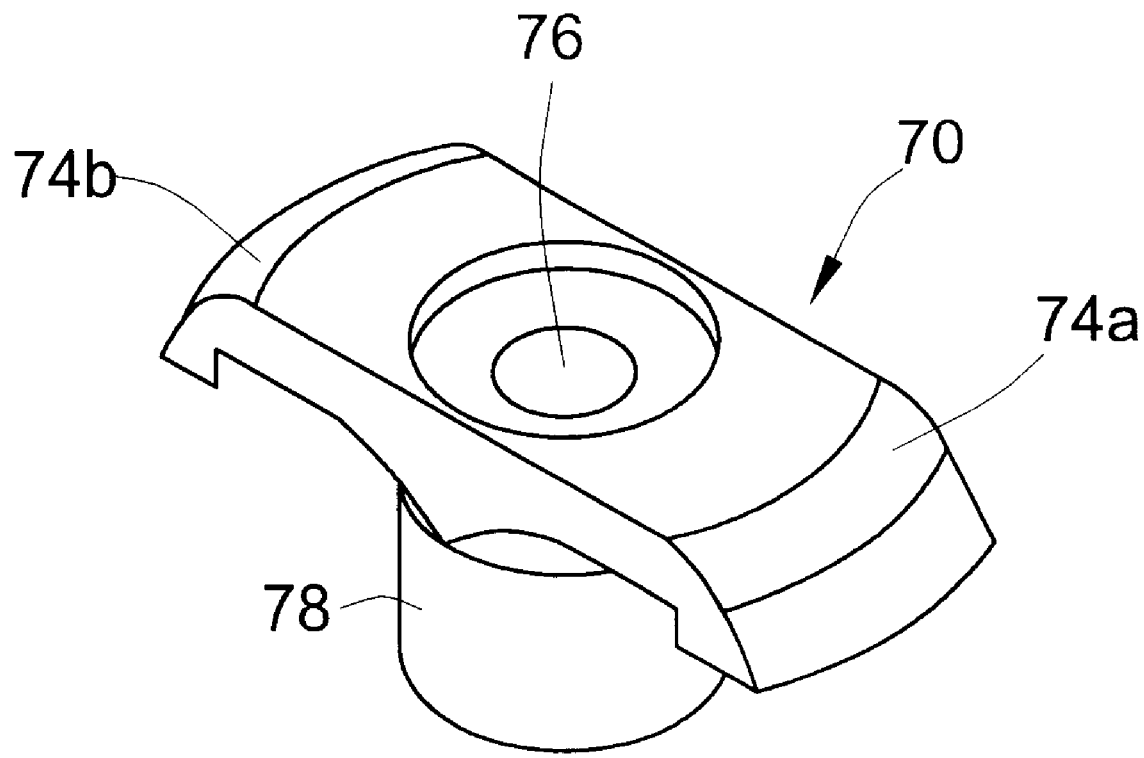
FIG. 5 illustrates a perspective view of a T-shaped clip member in a preferred embodiment of the present invention.

In a preferred embodiment of the present invention, FIG. 5 depicts a T-shaped clip member 70 in perspective view. The T-shaped clip member 70 includes a central stem 78, a first arm 74*a* connected to the central stem 78, a second arm 74*b* connected to the central stem 78, and a fastener opening 76 in the central stem 78. The fastener opening 76 is adapted to receive a fastener 110 (not shown) in order to attach the T-shaped clip member 70 to a surface A (not shown). The fastener 110 (not shown) can be a surface penetrating fastening device such as a screw or nail. The T-shaped clip member 70 can include multiple fastener openings 76. Alternatively, the T-shaped clip member 70 can be attached to the surface A with a glue or adhesive.

FIG. 6 depicts an elevation view of the T-shaped clip member 70. The T-shaped clip member 70 includes a top 71, a bottom 79, a central stem 78, a first arm 74*a* connected to the central stem 78, a second arm 74*b* connected to the central stem 78, and a fastener opening 76 in the central stem 78. The fastener opening 76 extends from the top 71 through the bottom 79. The fastener opening 76 can be, for example, a cylindrical bore hole. In one embodiment the fastener opening 76 can be sunken or countersunk. The top 71 and the bottom 79 of the T-shaped clip member 70 are generally parallel, defining a distance h. The distance h can be varied, that is, the T-shaped clip member 70 can have various heights in order to accommodate irregularities in the various surfaces onto which it is to be mounted. The first arm 74*a* includes a first overhang 75*a* at its terminal end; the first overhand 75*a* having a first angled face 72*a*, a first bottom flat face 73*a*, and a first underarm portion 77*a* facing opposite the central stem 78. In a preferred embodiment, the first underarm portion 77*a* has an angle of about 90°, one arm of which is defined by a first parallel wall 770*a* that is generally parallel to the central stem 78, and one arm of which is generally perpendicular to the central stem 78. The stem arm 74*b* includes a second overhang 75*b* at its terminal end; the second overhang 75*b* having a second angled face 72*b*, a second bottom flat face 73*b*, and a second underarm portion 77*b* facing opposite the central stem 78. In a preferred embodiment, the second underarm portion 77*b* has an angle of about 90°; one arm of which is defined by a second parallel wall 770*b* that is generally parallel to the central stem 78, and one arm of which is generally perpendicular to the central stem 78.

FIG. 7 depicts a side elevation view of the T-shaped clip member 70 of FIG. 6, showing the fastener opening 76, the first angled face 72*a*, and the central stem 78. The reverse side view is a mirror image of this view.

FIG. 8 depicts a bottom view of the T-shaped clip member 70 of FIG. 6, showing the fastener opening 76, the bottom 79, the first bottom flat face 73*a*, the second bottom flat face 73*b*, the first parallel wall 770*a*, and the second parallel wall 770*b*.

Figure 9:
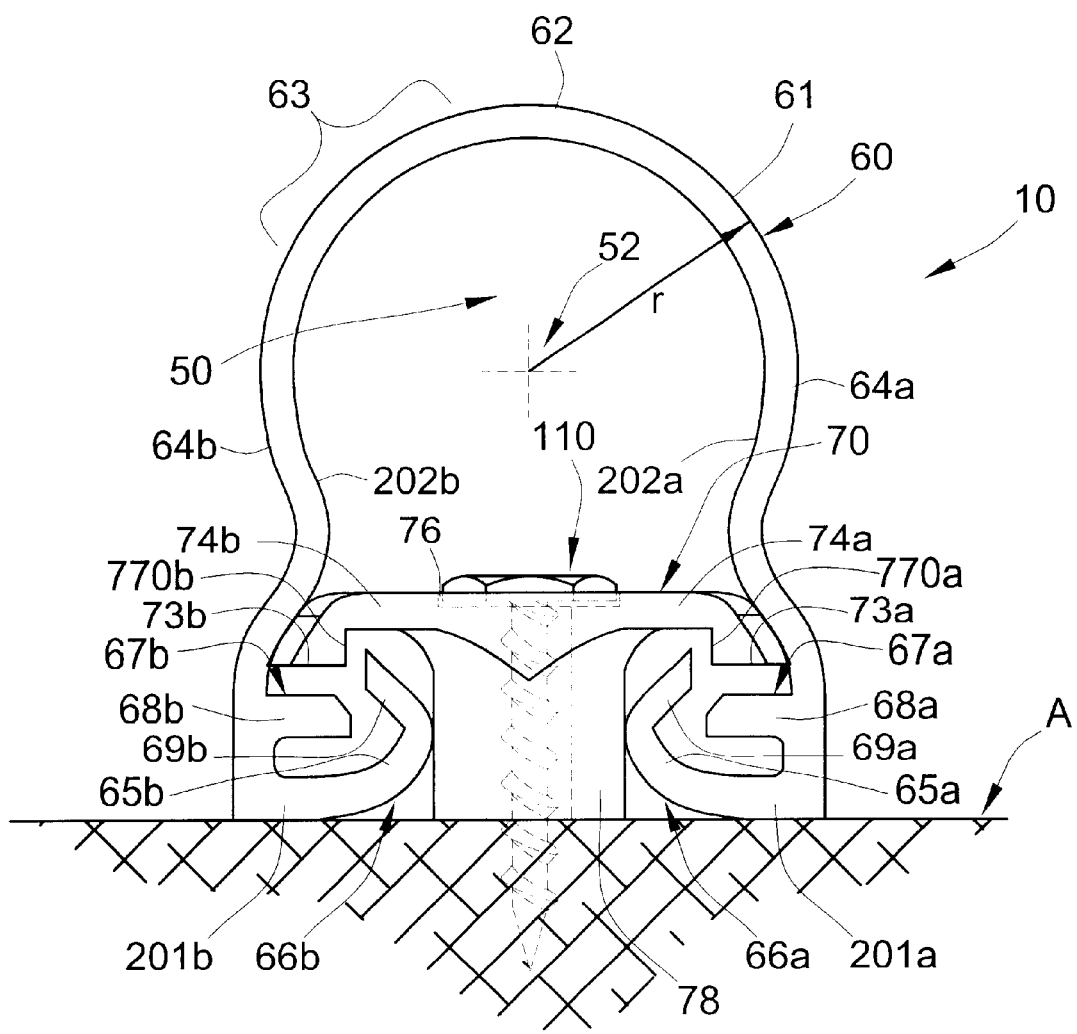
FIG. 9 illustrates a sectional view of a preferred embodiment of the containment apparatus of the present invention having a channel member, a T-shaped clip member, and a fastener, intersecting only the channel member.

As shown in FIG. 9, a preferred embodiment of the present invention is a containment apparatus 10 having an interior space 50, the containment apparatus 10 including a generally U-shaped channel member 60 and a T-shaped clip member 70. The generally U-shaped channel member 60 is adapted to be attached to the T-shaped clip member 70; the T-shaped clip member 70 is adapted to receive the generally U-shaped channel member 60. The generally U-shaped channel member 60, further having a bell shape, has an exterior surface 61 and includes a crown portion 62 having a circular arc shape 63, a first leg 64*a*, and a second leg 64*b*. The generally U-shaped channel member 60 is relatively long and extends linearly over a surface A; the T-shaped clip member 70 is relatively small in relation to the containment apparatus 10 and is adapted to the secured, mounted, or attached to the surface A. The generally U-shaped channel member 60 is adapted to generally contact the surface A with the first leg 64*a* and the second leg 64*b*. The surface A may be substantially flat, such as a wall or siding. Alternatively, the surface A may be substantially curved, such as a telephone pole. The first leg 64*a* of the generally U-shaped channel member 60 has an interior surface 202*a*, and the second leg 64*b* of the channel member 60 has an interior surface 202*b*. The first leg 64*a* includes a first tang 66*a* at its terminal end projecting into the interior space 50, and the second leg 64*b* includes a second tang 66*b* at its terminal end projecting into the interior space 50. The first tang 66*a* includes a first general abutment portion 201a, a first curved portion 65a, and a first end portion 69a at its terminal end; the second tang 66b includes a second general abutment portion 201b, a second curved portion 65b, and a second end portion 69b at its terminal end. The first general abutment portion 201a is generally perpendicular to the first leg 64a at the point where it projects from the first leg 64a, and the second general abutment portion 201b is generally perpendicular to the second leg 64b at the point where it projects from the second leg 64b. The first general abutment portion 201a and the second general abutment portion 201b are generally in a plane that is parallel to the surface A and are adapted to be in close contact with the surface A. In an alternative embodiment, the first general abutment portion 201a and the second general abutment portion 201b are generally in a plane that is tangential to the surface A and are adapted to be in close contact with the surface A. The first general abutment portion 201a is connected to the first curved portion 65a, which curves upward into the interior space 50 and then back toward the first leg 64a, and the first curved portion 65a is connected to the first end portion 69a, which projects toward the interior surface 202a of the first leg 64a but does not reach the interior surface 202a, providing a gap. The second general abutment portion 201b is connected to the second curved portion 65b, which curves upward into the interior space 50 and then back toward the second leg 64b, and the second curved portion 65b is connected to the second end portion 69b, which projects toward the interior surface 202b of the second leg 64b but does not reach the interior surface 202b, providing a gap. The first leg 64a also includes a first ledge 68a projecting into the interior space 50, disposed above the first general abutment portion 201a of the first tang 66a and generally parallel to the plane that contains the first general abutment portion 201a and the second general abutment portion 201b, and disposed below the first end portion 69a of the first tang 66a; the second leg 64b also includes a second ledge 68b projecting into the interior space 50, disposed above the second general abutment portion 201b of the second tang 66b and generally parallel to the plane that contains the first general abutment portion 201a and the second general abutment portion 201b, and disposed below the second end portion 69b of the second tang 66b. The first ledge 68a includes a first top face 67a, and the second ledge 68b includes a second top face 67b. Alternatively, the first tang 66a and the first ledge 68a may be integrally formed so as to provide a unitary piece; and alternatively, the second tang 66b and the second ledge 68b may be integrally formed so as to provide a unitary piece.

The circular arc shape 63 of the generally U-shaped channel member 60 includes a center of the channel member 52, which defines the approximate center point of the circular arc shape 63 that on average is approximately equidistant from any point on the circular arc shape 63. On average, any point on the circular arc shape 63 may be approximately equidistant from the center of the channel member 52. The circular arc shape 63 can be made having various diameters. A radius r is defined as the distance from the center of the generally U-shaped channel member 52 to the exterior surface 61. In a preferred embodiment, the radius r is about ½ inch, such that correct installations can be allowed with up to about 10° rotational misalignment between the generally U-shaped channel member 60 and the T-shaped clip member 70. The generally U-shaped channel member 60 can be made in elongated sections, for example in 4 foot, 6 foot, or 12 foot lengths, by a method such as extrusion. Multiple generally U-shaped channel members 60 can be adapted to be connected, one to another. The generally U-shaped channel member 60 can be rigid to semi-rigid, but must be at least slightly flexible, so that it can flex in a generally arcuate path that is away from the center of the channel member 52 whereby the generally U-shaped channel member 60 can be positioned to become attached to the T-shaped clip member 70, and can resile or can be urged in a generally arcuate path that is toward the center of the channel member 52 whereby the generally U-shaped channel member 60 can be attached to the T-shaped clip member 70. For example, first leg 64a and second leg 64b can flex in an generally arcuate path that is away from the center of the channel member 52 whereby the generally U-shaped channel member 60 can be positioned to become attached to the T-shaped clip member 70, and then first leg 64a and second leg 64b can resile or can be urged in a generally arcuate path that is toward the center of the channel member 52 whereby the generally U-shaped channel member 60 can be attached to the T-shaped clip member 70. Additionally, the first tang 66a can flex toward the interior surface 202a of the first leg 64a and the second tang 66b can flex toward the interior surface 202b of the second leg 64b whereby the generally U-shaped channel member 60 can be positioned to become attached to the T-shaped clip member 70, and then the first tang 66a can resile away or can be urged away from the interior surface 202a of the first leg 64a and the second tang 66b can resile away or can be urged away from the interior surface 202b of the second leg 64b whereby the generally U-shaped channel member 60 can be attached to the T-shaped clip member 70. Materials useful for fabrication of the generally U-shaped channel member 60 include plastic, wood, metal, and composite materials. Examples of plastics useful for the generally U-shaped channel member 60 of the present invention include, for example, PVC, PET, PE, and PP. A preferred plastic for fabrication of the generally U-shaped channel member 60 is PVC.

The T-shaped clip member 70 is adapted to be mounted to the surface A. The surface A may be substantially flat, such as a wall or siding. Alternatively, the surface A may be substantially curved, such as a telephone pole. As also shown in FIG. 6, the T-shaped clip member 70 includes a central stem 78, a first arm 74a connected to the central stem 78, a second arm 74b connected to the central stem 78, and a fastener opening 76 in the central stem 78. The fastener opening 76 is adapted to receive a fastener 110 in order to attach the T-shaped clip member 70 to the surface A. The fastener 110 can be a surface penetrating fastening device such as a screw or nail. The T-shaped clip member 70 can include multiple fastener openings 76. Alternatively, the T-shaped clip member 70 can be attached to the surface A with a glue or adhesive. Alternatively, the T-shaped clip member 70 and the fastener 110 may be integrally formed so as to provide a unitary piece. The first arm 74a includes a first overhand 75a at its terminal end; the first overhand 75a having a first angled face 72a, a first bottom flat face 73a, and a first underarm portion 77a facing opposite the central stem 78. In a preferred embodiment, the first underarm portion 77a has an angle of about 90°, one arm of the angle being defined by a first parallel wall 770a that is generally parallel to the central stem 78, and one arm of which is generally perpendicular to the central stem 78. The second arm 74b includes a second overhang 75b at its terminal end; the second overhand 75b having a second angled face 72b, a second bottom flat face 73b, and a second underarm portion 77b facing opposite the central stem 78. In a preferred embodiment, the second underarm portion 77b has an angle of about 90°, one arm of the angle being defined by a second parallel wall 770b that is generally parallel to the central stem 78, and one arm of which is generally perpendicular to the central stem 78. The T-shaped clip member 70 is also adapted to receive the generally U-shaped channel member 60 such that the first parallel wall 770a of the first arm 74a is adapted to engage the first tang 66a, and the first bottom flat face 73a of the first arm 74a is adapted to engage the first ledge 68a; and the second parallel wall 770b of the second arm 74b is adapted to engage the second tang 66b, and the second bottom flat face 73b of the second arm 74b is adapted to engage the second ledge 68b. Materials useful for fabrication of the T-shaped clip member 70 may be the same or different from the generally U-shaped channel member 60, but preferably a relatively rigid material, including, for example, metal, plastic, and composite materials. An example of a metal useful for the T-shaped clip member 70 is carbon steel. Examples of plastics useful for the T-shaped clip member 70 include PET, PE, PP, polycarbonate, and PTFE. A preferred plastic for fabrication of the T-shaped clip member 70 is PET. One example of a commercially available PET is PETRA® resin made by Honeywell Plastics (Morristown, N.J.). The T-shaped clip member 70 can be made by a method such as injection molding. In one embodiment, a plurality of T-shaped clip members 70 can be used to mount a length of the generally U-shaped channel member 60. For example, 3 or 4 T-shaped clip members 70 can be used to mount a 6 foot length of the generally U-shaped channel member 60.

Figure 10:
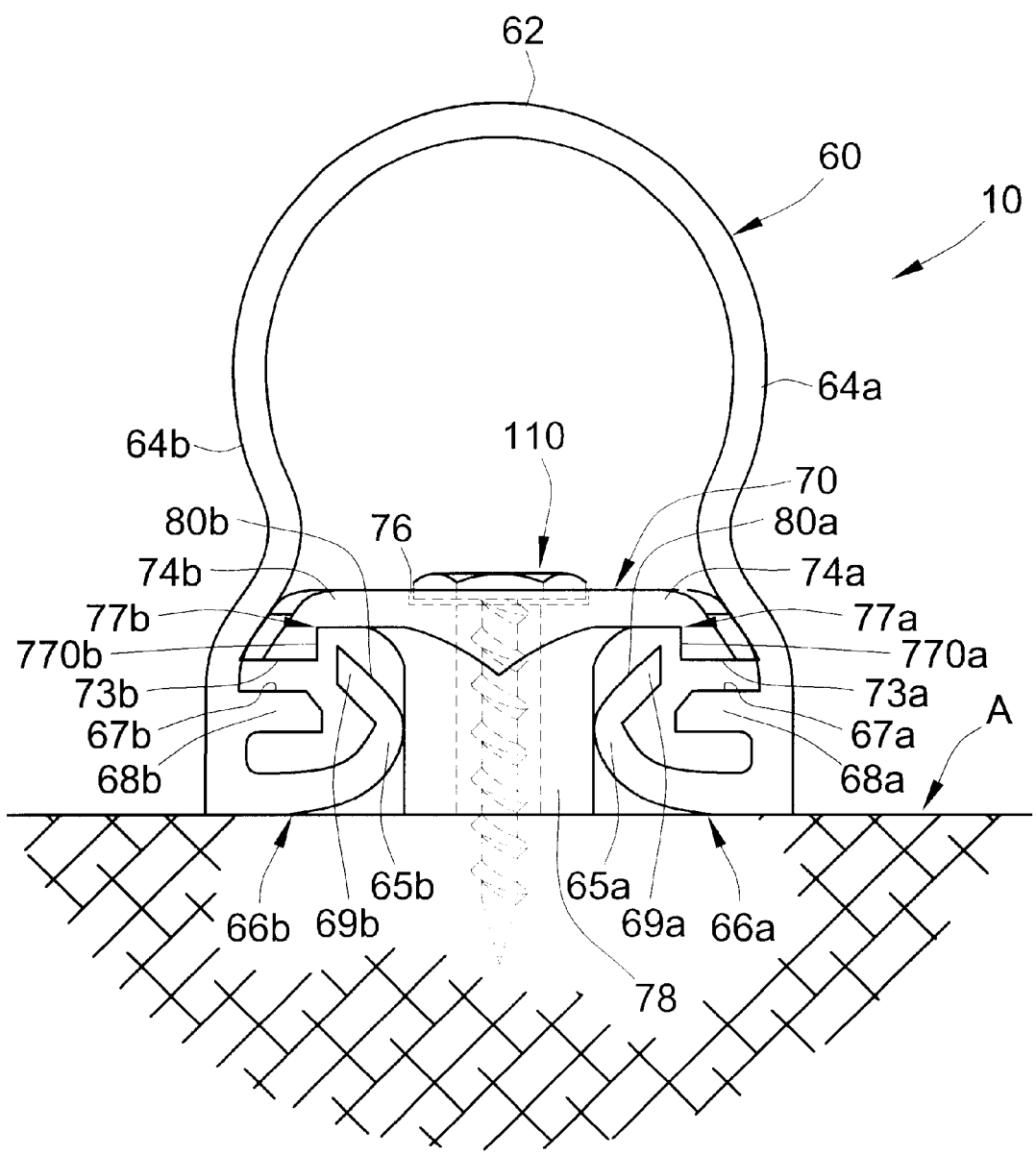
FIG. 10 is the sectional view of FIG. 9 depicting the contacting surfaces of the containment apparatus of the present invention that engage each other and connect the generally U-shaped channel member and the T-shaped clip member together.

FIG. 10 describes the contacting surfaces of a containment apparatus 10 that engage each other and connect a generally U-shaped channel member 60 and a T-shaped clip member 70 together, with reference to FIGS. 2, 6 and 9. As shown in FIG. 10, a generally U-shaped channel member 60 is adapted to be attached to a T-shaped clip member 70, and the T-shaped clip member 70 is adapted to receive a generally U-shaped channel member 60. The T-shaped clip member 70 can include a fastener opening 76 in a central stem 78 which is adapted to receive a fastener 110 in order to attach the T-shaped clip member 70 to a surface A. The fastener 110 can be a surface penetrating fastening device such as a screw or nail. In order to inhibit movement or prevent removal of the generally U-shaped channel member 60 generally in the direction of the crown portion 62 of the generally U-shaped channel member 60 or generally away from the surface A, the first bottom flat face 73a of the first arm 74a of the T-shaped clip member 70 engages the first top face 67a of the first ledge 68a of the generally U-shaped channel member 60, and the second bottom flat face 73b of the second arm 74b of the T-shaped clip member 70 engages the second top face 67b of the second ledge 68b of the generally U-shaped channel member 60. In order to inhibit movement or prevent removal in a direction that is generally parallel to the surface A, or tangential to the surface A, the first end portion 69a of the first tang 66a of the generally U-shaped channel member 60 engages the first parallel wall 770a of the first arm 74a of the T-shaped clip member 70, and the second end portion 69b of the second tang 66b of the generally U-shaped channel member 60 engages the second parallel wall 770b of the second arm 74b of the T-shaped clip member 70. Additionally, the first channel 100a (as shown in FIG. 2) of the generally U-shaped channel member 60 can be adapted to receive the first arm 74a of the T-shaped clip member 70, and the second channel 100b (as shown in FIG. 2) of the generally U-shaped channel member 60 can be adapted to receive the second arm 74b of the T-shape clip member 70. Thus, the generally U-shaped channel member 60 and the T-shaped clip member 70 can be engaged and connected to form the containment apparatus 10 of the present invention. In a preferred embodiment of the present invention, the generally U-shaped channel member 60 and the T-shaped clip member 70 can be generally tightly fitted together. In another embodiment of the present invention, the generally U-shaped channel member 60 and the T-shaped clip member 70 can be substantially fixedly attached.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A containment apparatus, comprising:
   a generally U-shaped channel member having a crown portion, a first leg and a second leg;
   a clip member having a first arm and a second arm, the clip member for mounting to a surface, the clip member further for connecting to the generally U-shaped channel member, the generally U-shaped channel member having an interior space for containing cylindrical objects, the first leg having an interior surface, and the second leg having an interior surface;
   a first ledge for connecting to the clip member disposed on the interior surface of the first leg;
   a first flexible tang for connecting to the clip member disposed on the interior surface of the first leg;
   a second ledge for connecting to the clip member disposed on the interior surface of the second leg; and
   a second flexible tang for connecting to the clip member disposed on the interior surface of the second leg;
     whereby upon connecting to the generally U-shaped channel member the first arm of the clip member engages the first flexible tang and the first ledge of the generally U-shaped channel member, and the second arm of the clip member engages the second flexible tang and the second ledge of the generally U-shaped channel member.

2. The containment apparatus of claim 1 wherein the generally U-shaped channel member flexes in an arcuate path that is away from a center of the channel member whereby the generally U-shaped channel member is positioned to become attached to the clip member, and wherein the generally U-shaped channel member resiles or is adapted to be urged in an arcuate path that is toward the center of the channel member whereby the generally U-shaped channel member is attached to the clip member.

3. The containment apparatus of claim 1 wherein the first flexible tang and the second flexible tang flex whereby the generally U-shaped channel member is positioned to become attached to the clip member, and wherein the first flexible tang and the second flexible tang resile or are adapted to be urged back into their original position whereby the generally U-shaped channel member is attached to the clip member.

4. The containment apparatus of claim 2 wherein the first flexible tang and the second flexible tang flex whereby the generally U-shaped channel member is positioned to become attached to the clip member, and wherein the first flexible tang and the second flexible tang resile or are adapted to be urged back into their original position whereby the generally U-shaped channel member is attached to the clip member.

5. The containment apparatus of claim 4 wherein the first flexible tang includes a first general abutment portion, a first curved portion, and terminates in a first end portion, wherein the first general abutment portion is generally adapted to contact the surface, and wherein the first general abutment portion is connected to the first curved portion, which curves upward into the interior space and then back toward the first leg, and wherein the first curved portion is connected to the first end portion, which projects toward the interior surface of the first leg; and wherein the second flexible tang includes a second general abutment portion, a second curved portion, and terminates in a second end portion, wherein the second general abutment portion is generally adapted to contact the surface, and wherein the second general abutment portion is connected to the second curved portion, which curves upward into the interior space and then back toward the second leg, and wherein the second curved portion is connected to the second end portion, which projects toward the interior surface of the second leg.

6. The containment apparatus of claim 5 wherein the first ledge projects into the interior space above the first general abutment portion of the first flexible tang and generally parallel to a plane that contains the first general abutment portion and the second general abutment portion, and below the first end portion of the first flexible tang; and wherein the second ledge projects into the interior space above the second general abutment portion of the second flexible tang and generally parallel to the plane that contains the first general abutment portion and the second general abutment portion, and below the second end portion of the second flexible tang.

7. The containment apparatus of claim 6 wherein the first ledge has at least a first top face and the second ledge has at least a second top face.

8. The containment apparatus of claim 7 wherein the first end portion of the first flexible tang has an angle of about 45° and the second end portion of the second flexible tang has an angle of about 45°.

9. The containment apparatus of claim 7 wherein the clip member is T-shaped.

10. The containment apparatus of claim 9 wherein the T-shaped clip member includes a central stem, the first arm and the second arm being connected to the central stem, and at least one fastener opening in the central stem adapted to receive a fastener whereby the T-shaped clip member is adapted to be fastened to the surface.

11. The containment apparatus of claim 10 wherein the first arm of the T-shaped clip member terminates in a first overhang facing the mounting surface, the first overhand having:

a first angled face;

a first bottom flat face; and a first underarm portion having an angle of about 90° opposite the central stem, one arm of the angle being defined by a first parallel wall that is generally parallel to the central stem; and wherein the second arm of the T-shaped clip member terminates in a second overhand facing the mounting surface, the second overhand having:

a second angled face;

a second bottom flat face; and a second underarm portion having an angle of about 90° opposite the central stem, one arm of the angle being defined by a second parallel wall that is generally parallel to the central stem.

12. The containment apparatus of claim 11 wherein the first bottom flat face of the first arm of the T-shaped clip member engages the first top face of the first ledge of the generally U-shaped channel member, and wherein the second bottom flat face of the second arm of the T-shaped clip member engages the second top face of the second ledges of the generally U-shaped channel member.

13. The containment apparatus of claim 11 wherein the first end portion of the first flexible tang of the generally U-shaped channel member engages the first parallel wall of the first arm of the T-shaped clip member, and wherein the second end portion of the second flexible tang of the generally U-shaped channel member engages the second parallel wall of the second arm of the T-shaped clip member.

14. The containment apparatus of claim 12 wherein the first end portion of the first flexible tang of the generally U-shaped channel member engages the first parallel wall of the first arm of the T-shaped clip member, and wherein the second end portion of the second flexible tang of the generally U-shaped channel member engages the second parallel wall of the second arm of the T-shaped clip member.

15. The containment apparatus of claim 14 wherein the first leg and the second leg of the generally U-shaped channel member flex in an arcuate path that is away from the center of the channel member whereby the generally U-shaped channel member is positioned to become attached to the T-shaped clip member, and wherein the first leg and the second leg of the generally U-shaped channel member resile or are adapted to be urged in an arcuate path that is toward the center of the channel member whereby the generally U-shaped channel member is attached to the T-shaped clip member.

16. The containment apparatus of claim 14 wherein the first flexible tang flexes toward the interior surface of the first leg and the second flexible tang flexes toward the interior surface of the second leg whereby the generally U-shaped channel member is positioned to become attached to the T-shaped clip member, and wherein the first flexible tang resiles away or is adapted to be urged away from the interior surface of the first leg and the second flexible tang resiles away or is adapted to be urged away from the interior surface of the second leg whereby the generally U-shaped channel member is attached to the T-shaped clip member.

17. The containment apparatus of claim 15 wherein the first flexible tang flexes toward the interior surface of the first leg and the second flexible tang flexes toward the interior surface of the second leg whereby the generally U-shaped channel member is positioned to become attached to the T-shaped clip member, and wherein the first flexible tang resiles away or is adapted to be urged away from the interior surface of the first leg and the second flexible tang resiles away or is adapted to be urged away from the interior surface of the second leg whereby the generally U-shaped channel member is attached to the T-shaped clip member.

18. The containment apparatus of claim 14 wherein the generally U-shaped channel member is bell-shaped.

19. The containment apparatus of claim 17 wherein the generally U-shaped channel member is bell-shaped.

20. The containment apparatus of claim 19 wherein the bell-shaped channel has a radius r.

21. The containment apparatus of claim 20 wherein the radius r is about ½ inch.

22. The containment apparatus of claim 1 wherein the clip member is T-shaped.

23. The containment apparatus of claim 1 wherein the generally U-shaped channel member is bell-shaped.

24. The containment apparatus of claim 23 wherein the bell-shaped channel has a radius r.

25. The containment apparatus of claim 24 wherein the radius r is about ½ inch.

* * * * *